(12) United States Patent
Chiba et al.

(10) Patent No.: US 8,140,106 B2
(45) Date of Patent: Mar. 20, 2012

(54) PEAK FACTOR REDUCTION DEVICE AND BASE STATION

(75) Inventors: Takahiro Chiba, Yokohama (JP); Masanori Taira, Yokohama (JP); Kazuyuki Hori, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 73 days.

(21) Appl. No.: 12/824,410

(22) Filed: Jun. 28, 2010

(65) Prior Publication Data

US 2011/0009153 A1 Jan. 13, 2011

(30) Foreign Application Priority Data

Jul. 10, 2009 (JP) ................................. 2009-163705

(51) Int. Cl.
*H04B 7/00* (2006.01)

(52) U.S. Cl. ...................... 455/522; 455/561; 455/114.1; 455/127.1

(58) Field of Classification Search .................. 455/561, 455/114.1–114.3, 127.1–127.3
See application file for complete search history.

(56) References Cited

U.S. PATENT DOCUMENTS

| 7,489,907 B2* | 2/2009 | Hasegawa et al. | 455/69 |
| 2004/0100210 A1* | 5/2004 | Hori et al. | 315/307 |

FOREIGN PATENT DOCUMENTS

| JP | 2003-124824 A | 4/2003 |
| JP | 2004-179813 A | 6/2004 |
| JP | 2008-103881 A | 5/2008 |
| JP | 2008-227724 A | 9/2008 |
| JP | 2009-100390 A | 5/2009 |

* cited by examiner

*Primary Examiner* — Fayyaz Alam

(74) *Attorney, Agent, or Firm* — Mattingly & Malur, PC

(57) ABSTRACT

The function of comparing power of a signal obtained by multiplying an input signal by an EVM target value and power of a peak suppression signal, and automatically adjusting a peak factor threshold value Vt in such a manner that the values of both power become equal to each other, is added to the peak factor reduction device. The peak factor reduction device is also added with the function of comparing instantaneous amplitude values of a signal Sout after a peak factor reduction and the peak factor threshold value Vt, and automatically calculating a peak detection width N so as to suppress the residual of each peak.

5 Claims, 17 Drawing Sheets

AMOUNT OF ADJUSTMENT TO PEAK DETECTION WIDTH    DEFAULT VALUE

AMOUNT OF ADJUSTMENT TO PEAK DETECTION WIDTH    OPTIMUM VALUE

PEAK FACTOR REDUCTION DEVICE AND BASE STATION

CLAIM OF PRIORITY

The present application claims priority from Japanese patent application serial no. 2009-163705, filed on Jul. 10, 2009, the content of which is hereby incorporated by reference into this application.

BACKGROUND OF THE INVENTION

The present invention relates to a peak factor reduction device and a base station, and particularly to a peak factor reduction device applied to an RF signal transmitter.

In order to enhance frequency utilization efficiency in a recent wireless communication field, greater importance has been placed on an orthogonal frequency division multiplexing (OFDM) system which modifies each individual base band signal with respective sub-carriers orthogonal to each other and transmits the same. Since the OFDM-modulated signal has a property close to a normal distribution, an instantaneous power ratio relative to average power i.e., a peak factor (peak to average power ratio) (or crest factor) becomes high. If sufficient linearity is not secured for the input/output characteristics of a power amplifier where such a signal is transmitted, then non-linear distortion occurs outside a transmission frequency band. This non-linear distortion becomes an interference signal to other wireless systems, and influences them.

One of measures taken against the interference signal is that the operating point of the power amplifier is lowered to ensure backoff for saturation output power, which improves the non-linear distortion outside the transmission frequency band. In the case of a signal large in peak factor as in the OFDM system, however, larger backoff becomes necessary. Therefore, transmission power efficiency of an RF signal transmitter is reduced. As a result, there is fear that power consumption for a device will increase.

As methods for solving such a problem, there are known: (1) a predistortion or feed-forward distortion compensation technique which compensates for non-linear distortion of the power amplifier and extends the operating range of the amplifier, and (2) a technique which reduces the occurrence of a peak factor at each base band signal. The present invention relates to the latter.

As a document that discloses the latter, may be mentioned, a peak factor reduction device described in a patent document 1 (JP-A-2003-124824). The peak factor reduction device of the patent document 1 includes a reference filter for band-limiting a complex input signal including two types of white base band signals having a uniform spectrum as real and imaginary parts, respectively, a delayer for delaying the complex input signal by a time corresponding to the propagation delay of the reference filter, an amplitude control unit or section for outputting a complex impulse signal having an amplitude proportional to an excess portion when an amplitude component of an output signal of the reference filter exceeds a set value, and a subtractor for subtracting the output signal of the amplitude control unit from the output signal of the delayer.

In the peak factor reduction device described in the patent document 1, a peak factor threshold value Vt is of a fixed value. It is necessary to set Vt in advance. When Vt to be set is low at this time, error vector magnitude (EVM) indicative of an effective value of a vector error increases. Since the increase in EVM influences the quality of a signal at transmission, the allowable value has been defined in terms of the standard. On the other hand, when the set threshold value is set high, EVM is low but the peak factor value becomes high. Hence, a burden on a power amplifier becomes larger. Namely, the setting of EVM and the peak factor threshold value is placed in a trade-off relationship.

Since the allowable value of EVM has been determined in terms of the standard in a large number of wireless base stations, the peak factor threshold value Vt may preferably be set low to such a degree that it does not exceed the EVM allowable value. Depending on transmission conditions such as a transmission frequency bandwidth, a detuning frequency between carriers, the optimum peak factor threshold value Vt changes because of change to frequency of occurrence of the peak. It is also not possible to calculate their values uniformly from those transmission conditions.

When multi-carrier transmission is performed, the phenomenon that the beat goes up occurs as the detuning frequency is detuned. In order to explain the beat phenomenon, an amplitude waveform where a base band signal of a bandwidth of 5 MHz is transmitted two carriers is shown in FIGS. 1A and 1B. FIG. 1A indicates a detuning frequency of 5 MHz, and FIG. 1B indicates a detuning frequency of 15 MHz. The vertical axes of FIGS. 1A and 1B indicate the absolute value of amplitude, and the horizontal axes thereof indicate time. In FIGS. 1A and 1B, fine beats are up as the detuning frequency becomes high.

Next, peak detection where a peak detection width N is wide (N=29) and narrow (N=5) at the beat phenomenon of FIG. 1B will be shown in FIGS. 2A and 2B. FIG. 2A shows where the peak detection width N is wide (N=29), and FIG. 2B shows where the peak detection width N is narrow (N=5). The vertical axes of FIGS. 2A and 2B indicate the absolute value of amplitude, and the horizontal axes thereof indicate time. As is apparent from FIGS. 2A and 2B, the detected number of peaks is low when the peak detection width N is broad. Also the detected number of peaks increases when the peak detection width N is narrow.

When signal levels each equivalent to the same level exist within samples at the peak detection width N where the peak detection width N is wide, the offsetting of peaks becomes incomplete and the peaks remain. On the other hand, when the peak detection width N is narrow, the peaks are excessively detected and EVM after a peak factor reduction becomes degraded. Therefore, it is necessary to set the peak detection width N to a value appropriate according to the transmission conditions. For this problem, the peak factor reduction devices have heretofore been stacked in multistage to prevent the peaks from remaining. However, this configuration will be not preferable from the point of view of implementation.

The present invention aims to provide a peak factor reduction device which makes peak offsetting perfect without increasing the logic scale, and a base station thereof.

SUMMARY OF THE INVENTION

The present invention has been made to solve the above-described problems. A target value of EVM is set to a peak factor reduction device to thereby automatically adjust a peak factor threshold value Vt according to each signal level. Thus, even when a transmission condition changes, EVM at a peak factor reduction can be made according to the set value.

An amplitude comparison circuit is added to the peak factor reduction device. Thus, the amplitude comparison circuit compares a peak factor threshold value set in advance and an instantaneous amplitude value after a peak factor reduction and automatically adjusts a peak detection width N. As a result, it is possible to suppress a logic scale and reduce the residual of each peak regardless of the transmission conditions.

The above processes can be used not only singly but also simultaneously. As a result, it is possible to reduce the residual rate of each peak after the peak factor reduction and perform a peak factor reduction within the EVM target value.

Each individual complex base band signal of at least one or more carriers is multiplied by a complex exponential function having a frequency corresponding to each base band signal generated by a numerical controlled oscillator (NCO) circuit to perform frequency conversion. A signal Sin obtained by additive synthesis after the frequency conversion is inputted to a peak detection circuit. The peak detection circuit detects an amplitude value Vp maximized within continuous N samples. A threshold value comparison circuit performs an amplitude comparison between the amplitude value Vp outputted from the peak detection circuit and a peak factor threshold value Vt, calculates an excessive level Vp−Vt from the peak factor threshold value Vt, and outputs a signal normalized with the output value Vp of the peak detection circuit. The output of the threshold value comparison circuit and an output of a delayer delayed by the number of samples in D1 corresponding to processing are multiplied by each other to thereby convert a peak component to an input signal level. Next, a FIL circuit performs a band limit to this output signal. Each output signal generated by the NCO circuit is multiplied by a complex exponential function delayed by the number of samples in D2 corresponding to a processing delay, and the so-obtained signals are added and combined together to generate a peak suppression signal. Finally, the multi-carrier composite signal Sin is delayed by the number of samples in D2 corresponding to a processing delay and subtracted from the peak suppression signal. This output signal Sout is a complex signal after a peak factor reduction.

The present invention is of a peak factor reduction device which makes it possible to automatically adjust the optimal peak factor threshold value reducible within an EVM target value and a set value of a peak detection width which reduces the residual rate of each peak, in addition to the conventional art described above. A peak factor threshold value brought to the optimum within the EVM target value is calculated using an output signal of a delayer and a peak suppression signal, which have been used for signal generation after a peak factor reduction. Firstly, the power difference between a power of reducible within the EVM target calculated by multiplying EVM target value and output signal of delayer and an actually-reduced power corresponding to the peak suppression signal is calculated, and outputted. Secondly, an integrator performs integration until the value of the difference comes to nought. The absence of the difference means that the actual EVM at the peak factor reduction becomes equal to a target value. Finally, a peak factor threshold value Vt obtained by adding the initial value of a peak factor to an output value of the integrator is fed back to a threshold value comparison circuit.

The principle of operation of the function of automatically adjusting the peak detection width will next be described below. An amplitude comparison circuit compares instantaneous amplitude values of a peak factor threshold value Vt and a signal Sout after a peak factor reduction first. Since each peak can be detected sufficiently with the peak detection width of the current situation where the peak factor threshold value Vt is higher in amplitude value than the signal Sout after the peak factor reduction, the amplitude comparison circuit feeds back the peak detection width to make it wide for EVM relaxation. On the other hand, since there is a possibility that the offsetting of peaks will be insufficient where the signal Sout is higher in amplitude value than the peak factor threshold value Vt, the amplitude comparison circuit feeds back the peak detection width to make it narrow. The amplitude comparison circuit adjusts the peak detection width on the basis of the result of comparison thereof and supplies the result of output to a peak detection circuit as a peak detection width N.

This invention provides a peak factor reduction device including: a generation section for multiplying a plurality of complex base band signals by complex exponential function signals having frequencies corresponding to the complex base band signals respectively to perform frequency conversion and adding and combining the frequency-converted signals together to generate a multi-carrier composite signal; a peak detection section for calculating an instantaneous amplitude value of the multi-carrier composite signal and detecting a peak amplitude value brought to a maximum within a detection width; a threshold value comparison section for comparing the peak amplitude value calculated by the peak detection section and a peak factor threshold value, calculating an excessive level by which the peak amplitude value exceeds the peak factor threshold value, and outputting a signal obtained by normalizing the excessive level with the peak amplitude value; a first delayer for delaying the complex base band signals by the number of samples corresponding to a processing delay of the peak detection section and the threshold value comparison section; a first multiplier for multiplying an output of the threshold value comparison section and an output of the first delayer by each other; a filter for band-limiting an output of the first multiplier; a second delayer for delaying the multi-carrier composite signal by the number of samples corresponding to a processing delay of the peak detection section, the threshold value comparison section, and the filter; a third delayer for delaying the complex exponential function signals by the number of samples corresponding to the processing delay of the peak detection section, the threshold value comparison section, and the filter; a second multiplier for multiplying an output of the filter and an output of the third delayer by each other to perform frequency conversion; an adder for performing an additive synthesis on an output of the second multiplier to generate a peak suppression signal; and a subtractor for subtracting the peak suppression signal from an output of the second delayer.

This invention also provides a base station including: a remote radio head for performing wireless signal processing; and a base band unit, wherein the remote radio head includes a second filter for band-limiting a base band signal outputted from the base band unit, a peak factor reduction device for suppressing instantaneous power relative to average power from an output of the second filter, a digital predistortion circuit for compensating for a non-linear component of a power amplifier of a subsequent stage with respect to an output signal of the peak factor reduction device, and the power amplifier for power-amplifying an output of the digital predistortion circuit, and wherein the peak factor reduction device includes: a generation section for multiplying a plurality of complex base band signals by complex exponential function signals having frequencies corresponding to the complex base band signals respectively to perform frequency conversion, and adding and combining the frequency-converted signals together to generate a multi-carrier composite signal; a peak detection section for calculating an instantaneous amplitude value of the multi-carrier composite signal and detecting a peak amplitude value brought to a maximum within a detection width; a threshold value comparison section for comparing the peak amplitude value calculated by the peak detection section and a peak factor threshold value, calculating an excessive level by which the peak amplitude value exceeds the peak factor threshold value, and outputting a signal obtained by normalizing the excessive level with the peak amplitude value; a first delayer for delaying the complex base band signals by the number of samples corresponding to a processing delay of the peak detection section and the threshold value comparison section; a first multiplier for multiplying an output of the threshold value comparison section and an output of the first delayer by each other; a filter for band-limiting an output of the first multiplier; a second delayer for delaying the multi-carrier composite signal by the number of samples corresponding to a processing delay of the peak detection section, the threshold value comparison section, and the filter; a third delayer for delaying the complex exponential function signals by the number of samples corresponding to the processing delay of the peak detection section, the threshold value comparison section, and the filter; a second multiplier for multiplying an output of the filter and an output of the third delayer by each other to perform frequency conversion; an adder for performing an additive synthesis on an output of the second multiplier to generate a peak suppression signal; and a subtractor for subtracting the peak suppression signal from an output of the second delayer.

As described above, the present invention provides a peak factor reduction device that enables peak factor reducing processing within an EVM target value and enables a reduction in the residual rate of a peak factor, and a base station thereof. Applying the present invention makes it possible to suppress a logic scale than the conventional peak factor reduction device. Therefore, savings in power consumption can be realized for the entire device and the base station, and high efficiency of the device and the base station can be achieved.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Figure 1A:
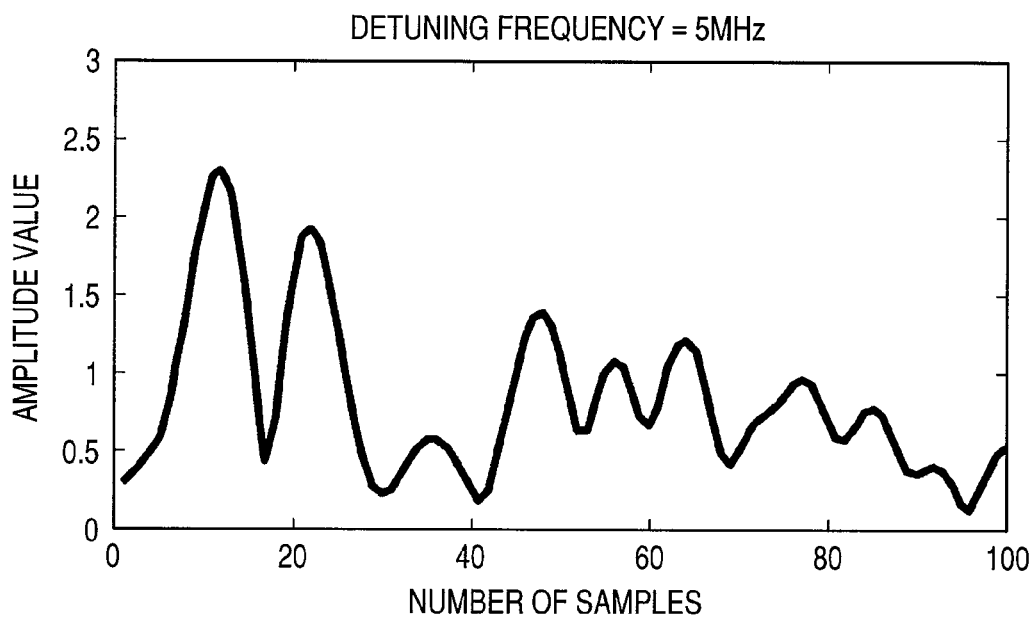
FIGS. 1A and 1B are graphs showing beat waveforms.
Figure 1B:
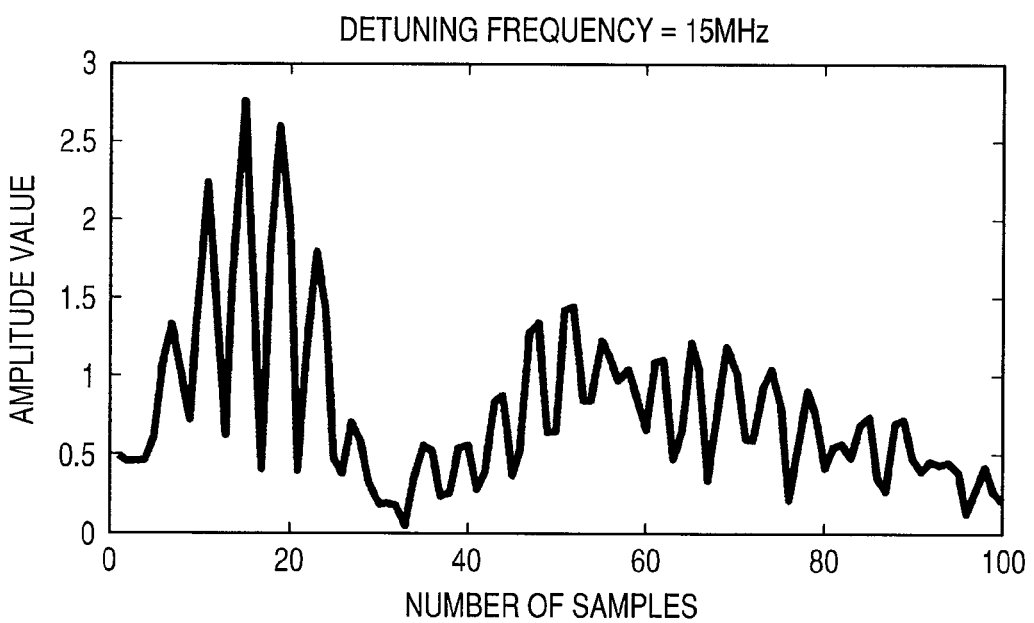
Figure 2A:
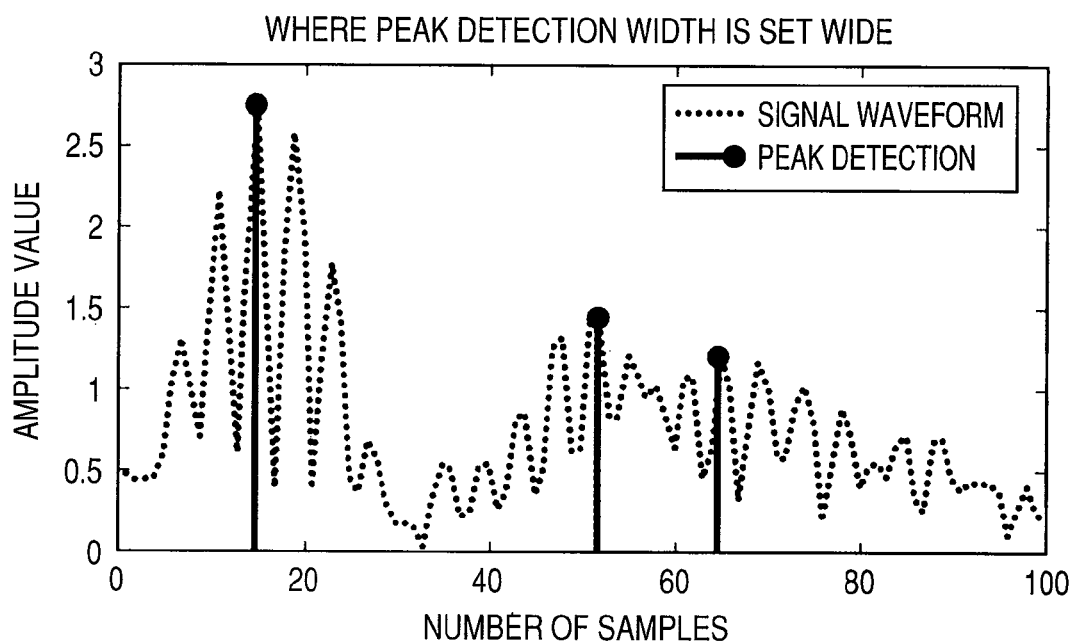
FIGS. 2A and 2B are diagrams showing relationships between a peak detection width and peak detection.
Figure 2B:
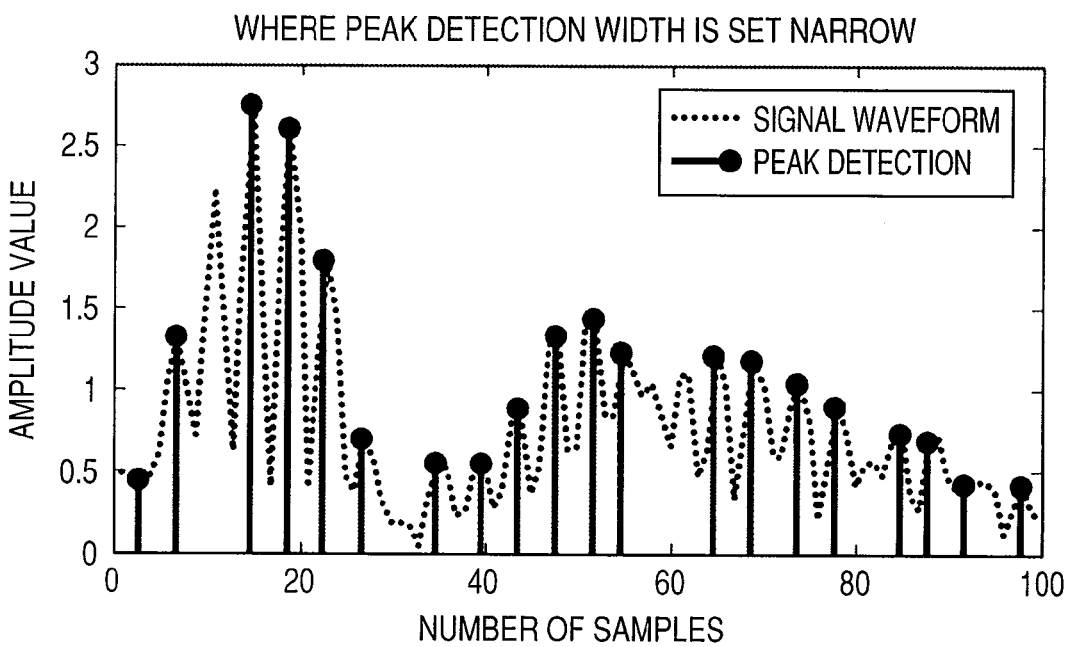

Embodiments of the present invention will hereinafter be explained in detail by way of example and with reference to the accompanying drawings. Incidentally, the same reference numerals are respectively attached to substantially the same portions, and their explanations will therefore not be repeated.

First Embodiment

Figure 3:
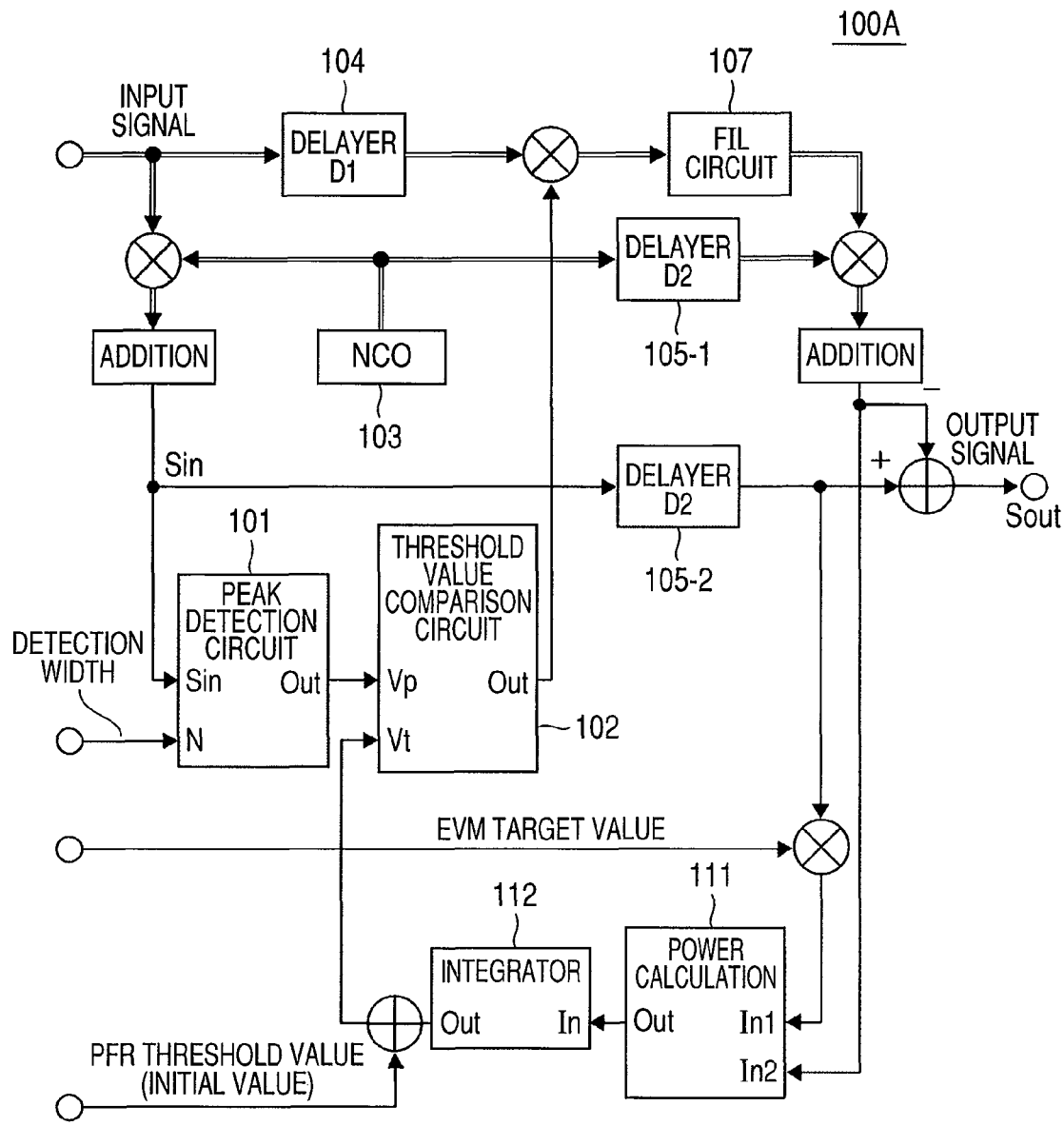
FIG. 3 is a circuit block diagram of a peak factor reduction device.

A first embodiment will be explained with reference to FIGS. 3 through 9. In FIG. 3, a peak factor reduction device 100A includes a peak detection circuit 101, a threshold value comparison circuit 102, an NCO 103, a delayer 104, two delayers 105, a filter (FIL) circuit 107, a power calculation circuit 111, an integrator 112, a plurality of adders, and a plurality of multipliers. Inputs to the peak factor reduction device 100A include an input signal, a detection width, an EVM target value, and a PFR initial threshold value. The input signal is of a complex signal having I and Q components. An output of the peak factor reduction device 100A is of an output signal reduced in peak factor. Incidentally, double lines defined between blocks in the following drawings mean plural signals respectively.

Firstly, the peak factor reduction device 100A multiplies complex base band signals of at least one or more carriers each having a uniform spectrum by complex exponential functions each having a frequency corresponding to each base band signal generated by the NCO 103, to perform frequency conversion on the result thereof, followed by execution of their additive synthesis. The peak factor reduction device 100A inputs the multi-carrier composite signal Sin subjected to the additive synthesis to the peak detection circuit 101. The peak detection circuit 101 detects an amplitude value Vp brought to the maximum within detection width N samples. The threshold value comparison circuit 102 detects a sample that exceeds a threshold level Vt set in advance and performs its normalization at the peak amplitude value Vp, followed by resulting in the provision of the normalized output. The output of the threshold value comparison circuit and the input signal delayed by the number of samples in D1 corresponding to processing are multiplied by each other and thereby a peak component is converted to an input signal level. Thereafter, the FIL circuit 107 performs a band limit thereon.

An output of the FIL circuit 107 and each complex exponential function corresponding to the NCO output delayed by the number of samples in D2 corresponding to these processing are multiplied by each other, and an additive synthesis is performed on the result of multiplication to generate a peak suppression signal. Finally, the peak suppression signal is subtracted from the multi-carrier composite signal Sin delayed by the number of samples in D2 corresponding to processing. According to the above processing, the peak factor reduction device 100A outputs a peak factor-reduced base band signal Sout without degrading a frequency out-of-band spectrum.

Figure 4:
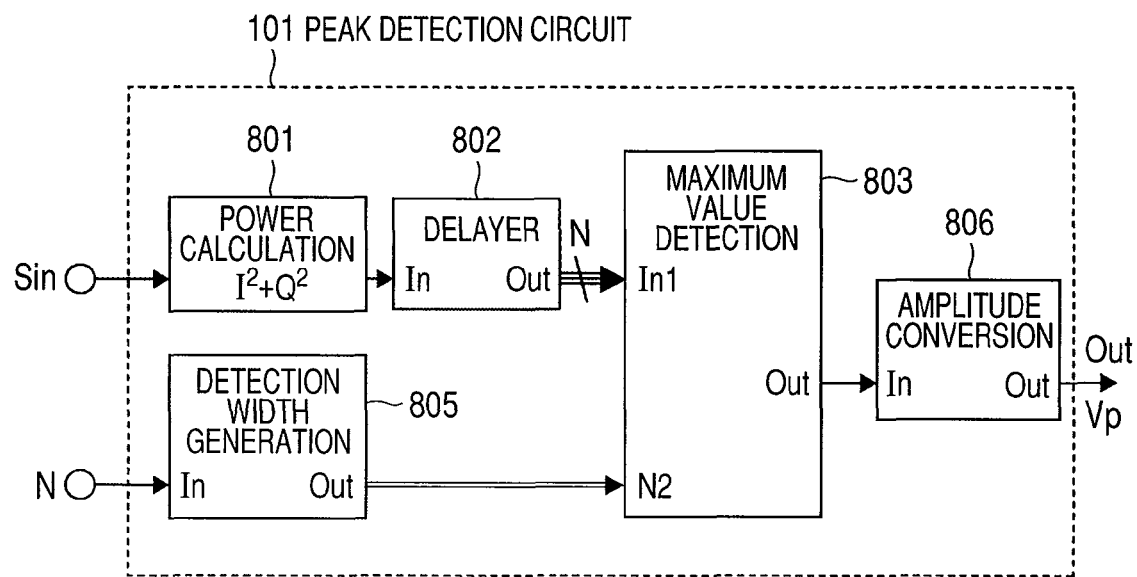
FIG. 4 is a circuit block diagram of a peak detection circuit.

In FIG. 4, the peak detection circuit 101 includes a power calculation circuit 801, a delayer 802, a maximum value detection circuit 803, a detection width generation circuit 805, and an amplitude conversion circuit 806. The power calculation circuit 801 takes the sum of squares of a real part and an imaginary part to generate an instantaneous power component. The delayer 802 delays it by (N−1) samples and outputs N signals therefrom. The maximum value detection circuit 803 detects a maximum value within continuous N samples. The detection width generation circuit 805 generates a detection width for detecting a maximum value, based on the inputted detection width N. A tap length of the detection width is assumed to be (N−3)/2, an effective tap is expressed in "0" and an ineffective tap is expressed in "1". A sequence of an arrangement is configured in the order of the number of ineffective taps+the number of effective taps. When all the taps are effective, ALL0 is taken. When all the taps are ineffective, ALL1 is taken. The amplitude conversion circuit 806 converts power to its corresponding amplitude again.

Figure 5:
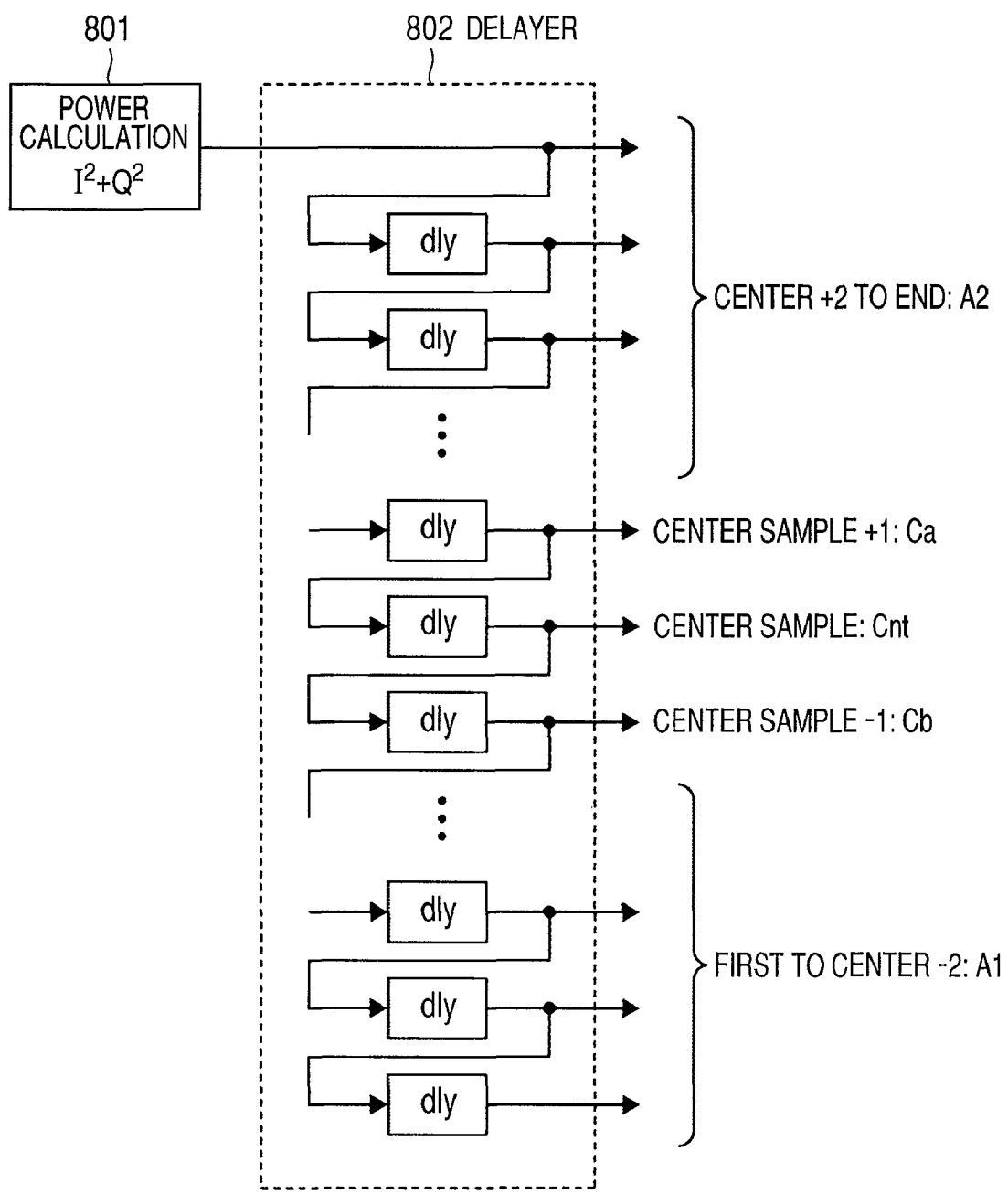
FIG. 5 is a circuit block diagram of a delayer.

The delayer 802 will be explained with reference to FIG. 5. In FIG. 5, the delayer 802 includes delay elements dly of (N−1) stages. The delayer 802 separates and outputs a center−2 (minus 2) as viewed from the first (head) of the delay elements dly as A1, a center−1 as Cb, a center as Cnt, a center+1 as Ca and a center+2 to END as A2, respectively.

Figure 6:
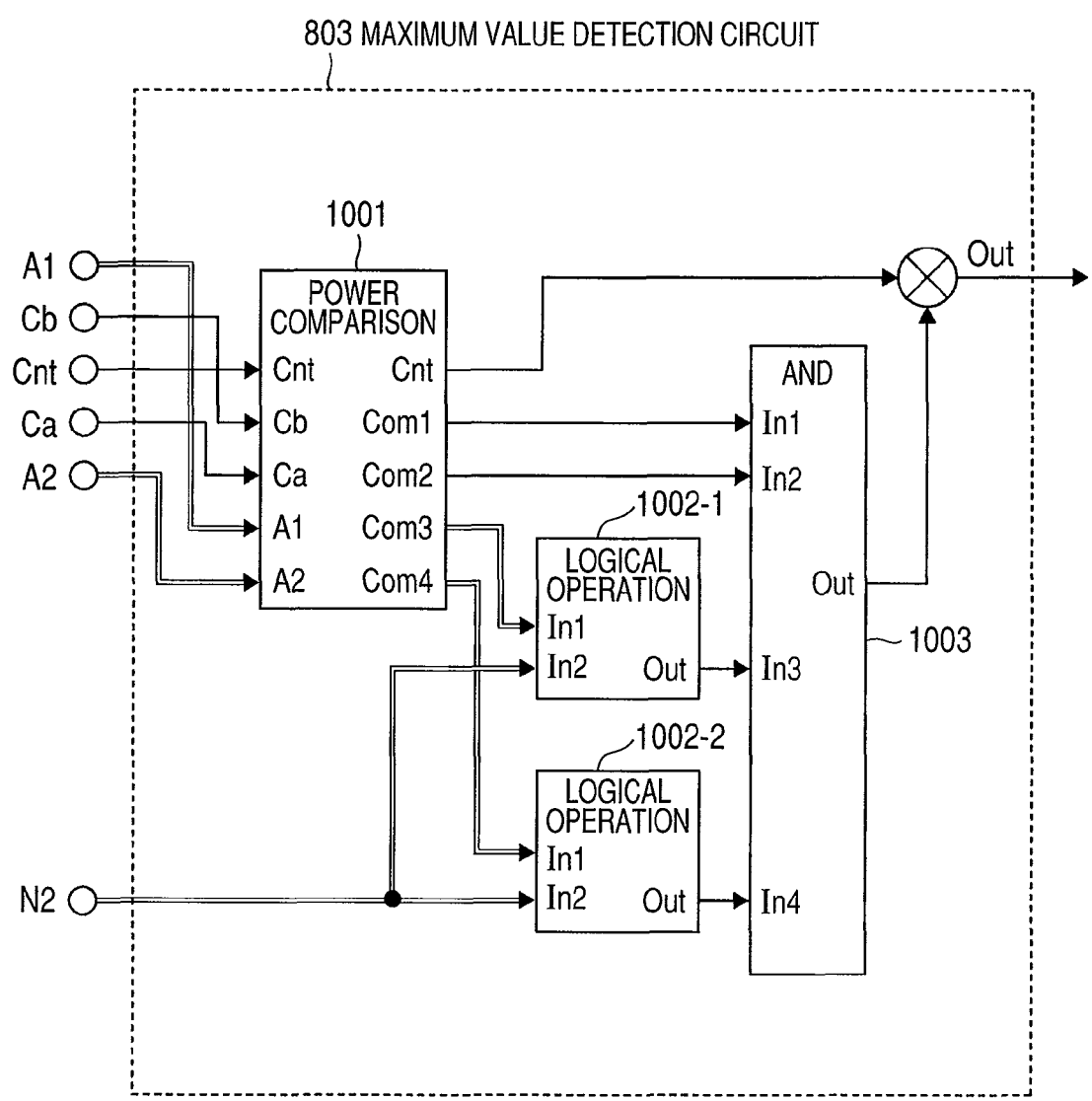
FIG. 6 is a circuit block diagram of a maximum value detection circuit.

In FIG. 6, the maximum value detection circuit 803 includes a power comparison section 1001, two logical operation circuits 1002, an AND circuit 1003, and a multiplier. The power comparison section 1001 performs a power comparison between a center sample Cnt and a Ca sample, and between a center sample Cnt and a Cb sample. When power of the Ca sample and the Cb sample are respectively lower than that of the center sample Cnt, the power comparison section 1001 outputs "0". On the other hand, when power are higher than that of the center sample Cnt, the power comparison section 1001 outputs "1". The output of the Ca sample is set as Com2. The output of the Cb sample is set as Com1.

The logical operation circuits 1002 perform OR operations on the signals generated by the detection width generation circuit 805 of FIG. 4 with respect to a continuous sample A1 from the first sample to those being located two previous to the center sample Cnt and a continuous sample A2 from those being located two subsequent to the center sample Cnt to the final sample, respectively and thereafter performs AND operations thereon. The maximum value detection circuit 803 performs AND operations on Com1, Com2, and outputs of the two logical operation circuits 1002. Finally, the maximum value detection circuit 803 performs multiplication between the output result of AND operations and the center sample Cnt.

Turning back to FIG. 4, the amplitude conversion circuit 806 finally takes the square root of a power value to perform conversion into an amplitude value and outputs it as an amplitude value Vp.

In FIG. 3, the threshold value comparison circuit 102 performs a threshold comparison between the amplitude value Vp outputted from the peak detection circuit 101 and its corresponding peak factor threshold value Vt.

Figure 7:
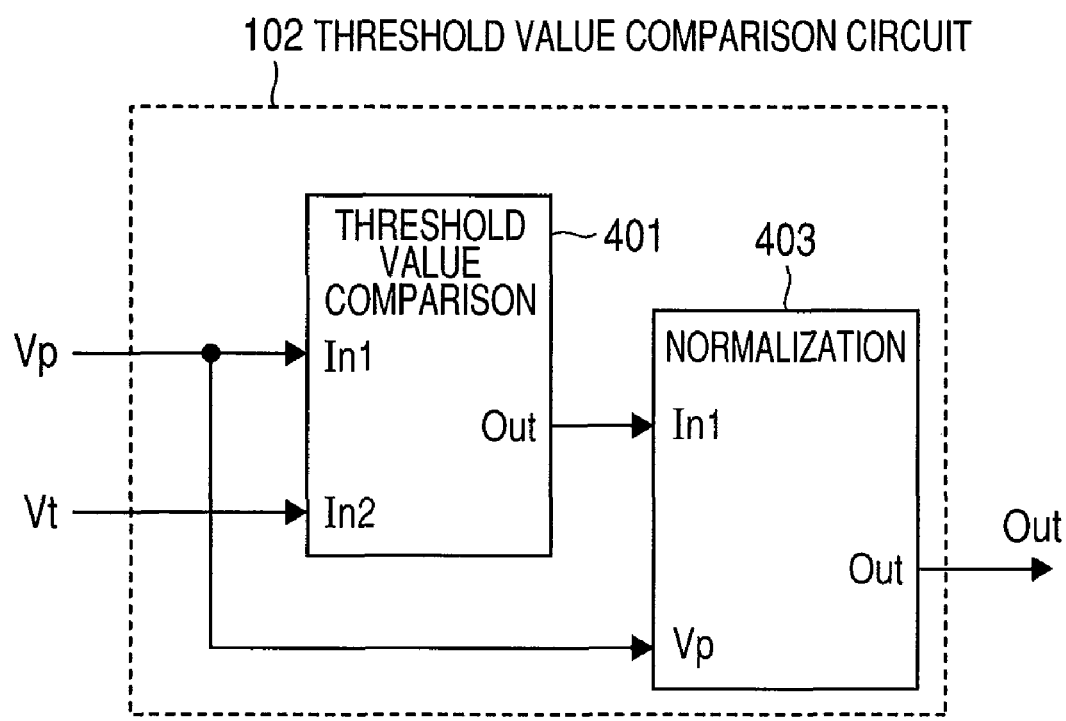
FIG. 7 is a circuit block diagram of a threshold value comparison circuit.

The threshold value comparison circuit 102 will be explained with reference to FIG. 7. In FIG. 7, the threshold value comparison circuit 102 includes a threshold value comparison section 401 and a normalization section 403. The threshold value comparison section 401 subtracts the peak factor threshold value Vt from the output value Vp of the peak detection circuit 101 and forcefully converts a negative output to 0. The normalization section 403 outputs a value obtained by normalizing the output value of the threshold value comparison section 401 by the peak amplitude value Vp.

Turning back to FIG. 3, the peak factor reduction device 100A multiplies the result outputted from the threshold value comparison circuit 102 and the input signal delayed by the number of samples in D1 corresponding to the processing delay by each other. As a result, the peak factor reduction device 100A outputs each complex peak pulse component. Thereafter, the FIL circuit 107 performs a band limit thereon. The peak factor reduction device 100A multiplies the output of the FIL circuit 107 and the output of the NCO 103, which has been delayed by the number of samples corresponding to the above processing by each other and performs an additive synthesis on the result of multiplication to generate a peak suppression signal. Finally, the peak factor reduction device 100A subtracts the peak suppression signal from the corresponding multi-carrier composite signal Sin and outputs an output signal Sout after a peak factor reduction.

Figure 8A:
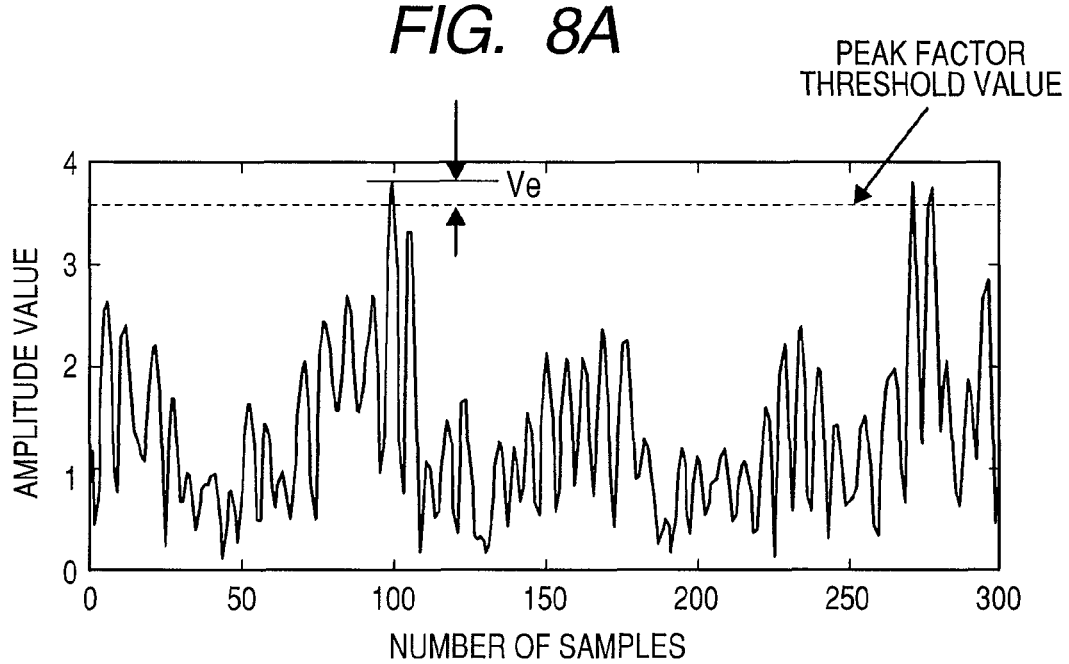
FIGS. 8A and 8B are diagrams showing peak-detected waveforms.
Figure 8B:
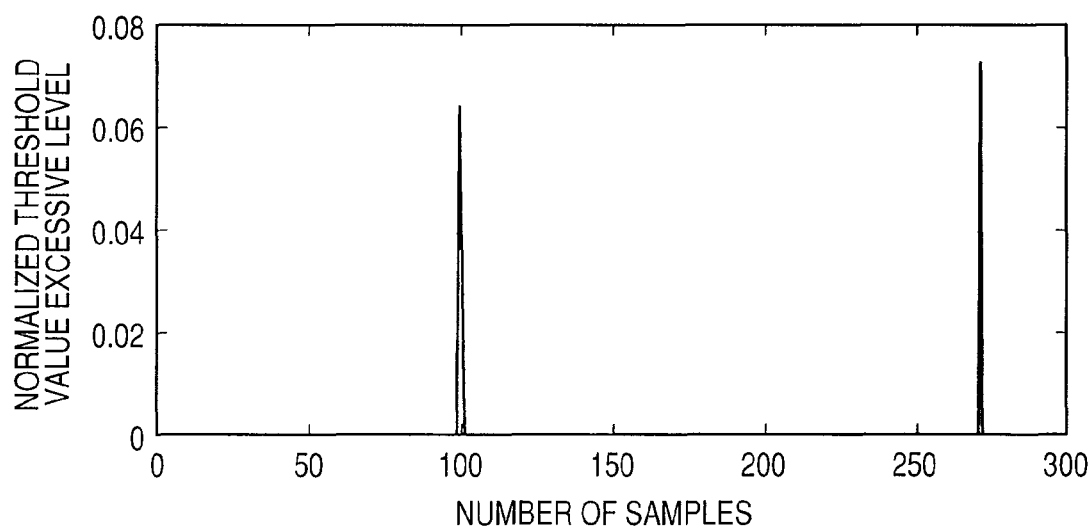

The complex peak pulse components will be explained with reference to FIGS. 8A and 8B. The vertical axis of FIG. 8A indicates an amplitude value, and the horizontal axis thereof indicates time (number of samples). The vertical axis of FIG. 8B indicates a normalized threshold value excessive level, and the horizontal axis thereof indicates time (number of samples). Each peak appears in FIG. 8B in response to the number of samples having exceeded the peak factor threshold value of FIG. 8A. Incidentally, one peak appears in FIG. 8B in response to the two numbers of samples each having exceeded the peak factor threshold value of FIG. 8A in the vicinity of the number of samples 270 because the two numbers of samples having exceeded the peak factor threshold value fall within one detection width.

Turning back to FIG. 3 again, the peak factor reduction device 100A calculates the optimal peak factor threshold value Vt using the multi-carrier composite signal Sin delayed by the number of samples at the peak factor reducing processing and the peak suppression signal.

Figure 9:
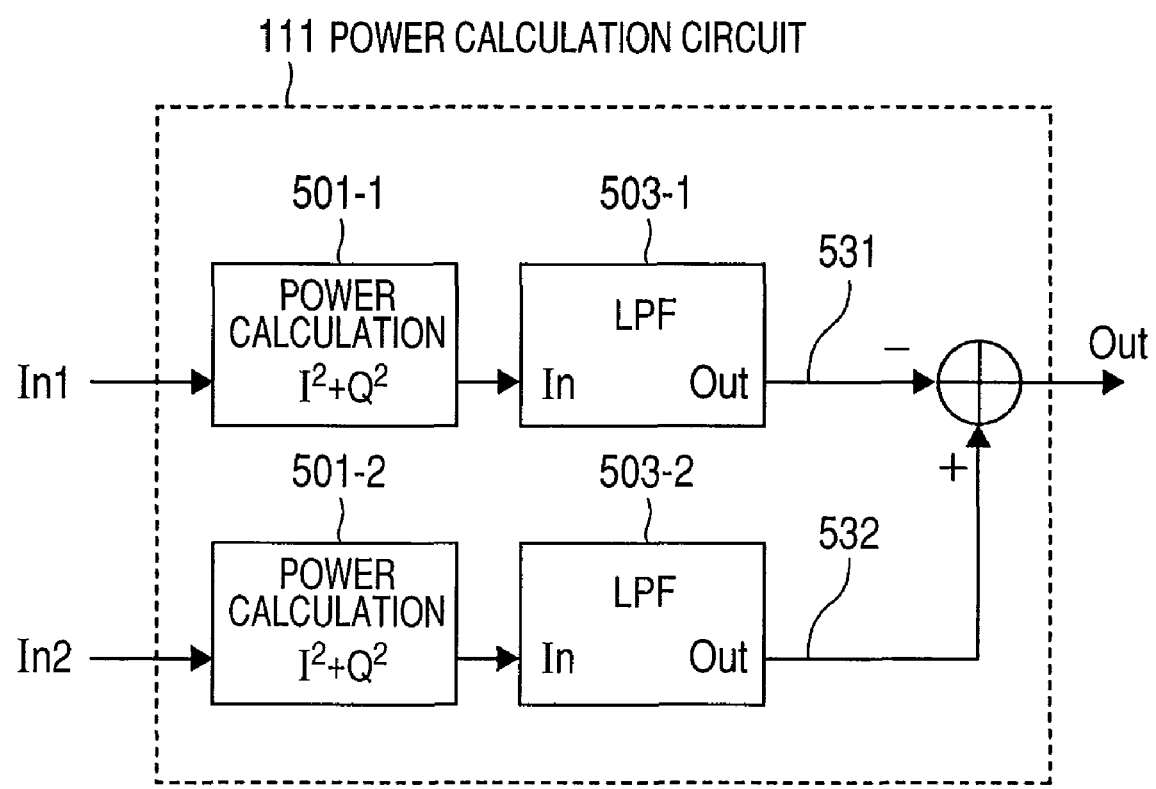
FIG. 9 is a circuit block diagram of a power calculation circuit.

The power calculation circuit 111 will be explained with reference to FIG. 9. As shown in FIG. 9, the power calculation circuit 111 includes two power calculation sections 501, two low-pass filters (LPFs) each connected to the output of the power calculation circuit 501, and an adder. The power calculation circuit 111 takes a result of multiplication between the multi-carrier composite signal Sin and the EVM target value as an input of In1. The power calculation circuit 111 takes the peak suppression signal as an input of In2.

The power calculation circuit 111 calculates a power level reducible within the EVM target value of In1 and a power level of the peak suppression signal of In2, which is to be actually reduced, through the use of the power calculation sections 501. The power calculation circuit 111 allows each of the results of the calculation to pass through the steep LPFs to perform a band limit to the power levels. Here, the purpose of converting the complex signal to the power is to perform a comparison of the EVM value.

$$|S'|^2 = |\overline{S} \times EVM_{tgt}|^2 = |\overline{S}|^2 \times EVM_{tgt}^2 \quad (1)$$

$$EVM = \sqrt{\frac{|\overline{E}|^2}{|\overline{S}|^2}} \quad (2)$$

$$|\overline{E}|^2 = |\overline{S}|^2 \times EVM^2 \quad (3)$$

The EVM of the power level reducible within the target value, which has been multiplied by the EVM target value, is first calculated from the equation (1). The EVM of the power level that is to be actually reduced is converted by the equation (1). The EVM thereof is calculated from the equation (2). Solving the equation (2) about an error component E yields the calculation of the equation (3). The power calculation circuit 111 performs subtraction processing on these equations (1) and (3) by means of the adder.

Turning back to FIG. 3 still again, the peak factor reduction device 100A performs integration through the integrator of the subsequent stage until the difference between the power level reducible within the EVM target value and the power level of the peak suppression signal which is to be actually reduced, becomes nought. Therefore, the peak factor reduction device 100A has a positive or negative slope immediately after its operation. This slope, however, gradually becomes gentle and is finally kept in equilibrium. At this time, it shows that the actual EVM becomes equal to the target value. Finally, the peak factor reduction device 100A performs addition of the initial value (PFR initial threshold value) of the peak factor threshold value Vt and the above integrated value and thereby feeds back the result of addition to the threshold value comparison circuit 102 as the optimum peak factor threshold value Vt.

When the peak factor threshold value Vt is not automatically adjusted, the output of the power calculation circuit 111 is forcefully brought to zero using a selector or the like. Thus, the threshold value of the initial value set in advance is always outputted.

According to the first embodiment, it is possible to realize the peak factor reduction device having the automatic adjustment of the peak factor threshold value for performing the peak factor reduction within the EVM target value.

Second Embodiment

A second embodiment will next be explained with reference to FIGS. 10 through 12. When the peak limit is incomplete and the error component remains as a result of offsetting of the peak factors in the peak factor reduction circuit, the peak factor reduction devices have heretofore been stacked in multistage in the patent document 1. When such a configuration is taken, the logic scale as for each peak factor reduction device increases.

Figure 10:
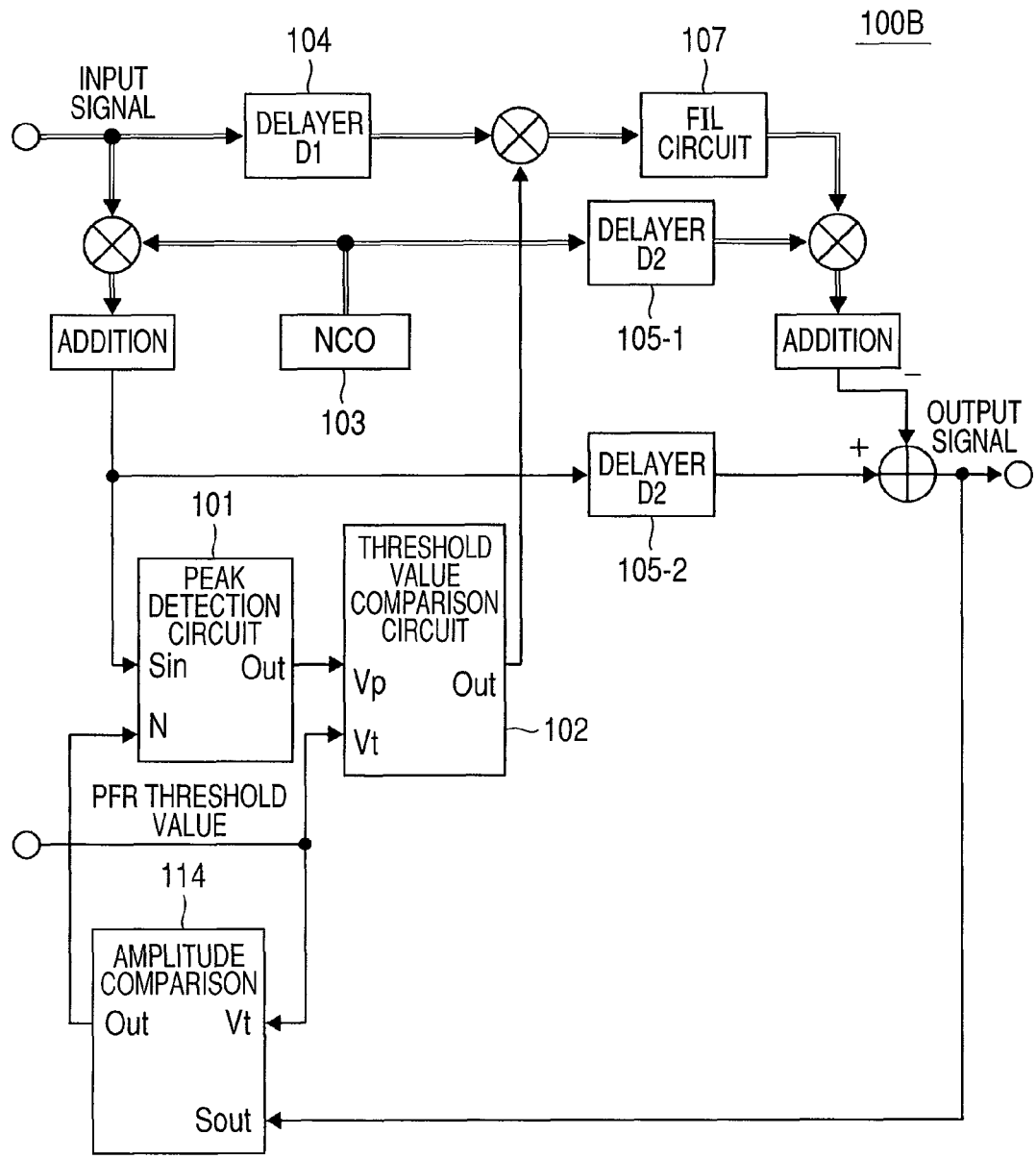
FIG. 10 is another circuit block diagram of a peak factor reduction device.

A function for automatically adjusting a peak detection width at a peak factor reduction device 100B will therefore be described while referring to FIG. 10. Making this adjustment effective enables reducing the remaining or residual probability of an error component at the offsetting of peak factors. A peak factor reduction technique is similar to that according to the first embodiment. In FIG. 10, the peak factor reduction device 100B includes a peak detection circuit 101, a threshold value comparison circuit 102, an NCO 103, a delayer 104, two delayers 105, a FIL circuit 107, an amplitude comparison circuit 114, a plurality of adders, and a plurality of multipliers. Inputs to the peak factor reduction device 100B include an input signal and a PFR threshold value. The input signal is of a complex signal having I and Q components. An output of the peak factor reduction device 100B is of an output signal reduced in peak factor.

The peak factor reduction device 100B automatically adjusts a peak detection width of the peak factor reduction device using a peak factor threshold value Vt used as the input and an output signal Sout after a peak factor reduction. This will be explained with reference to FIG. 11. In FIG. 11, the amplitude comparison circuit 114 includes two amplitude calculation circuits 601, an amplitude comparison section 603, a delayer 605, a selector 606, and an adder.

Figure 11:
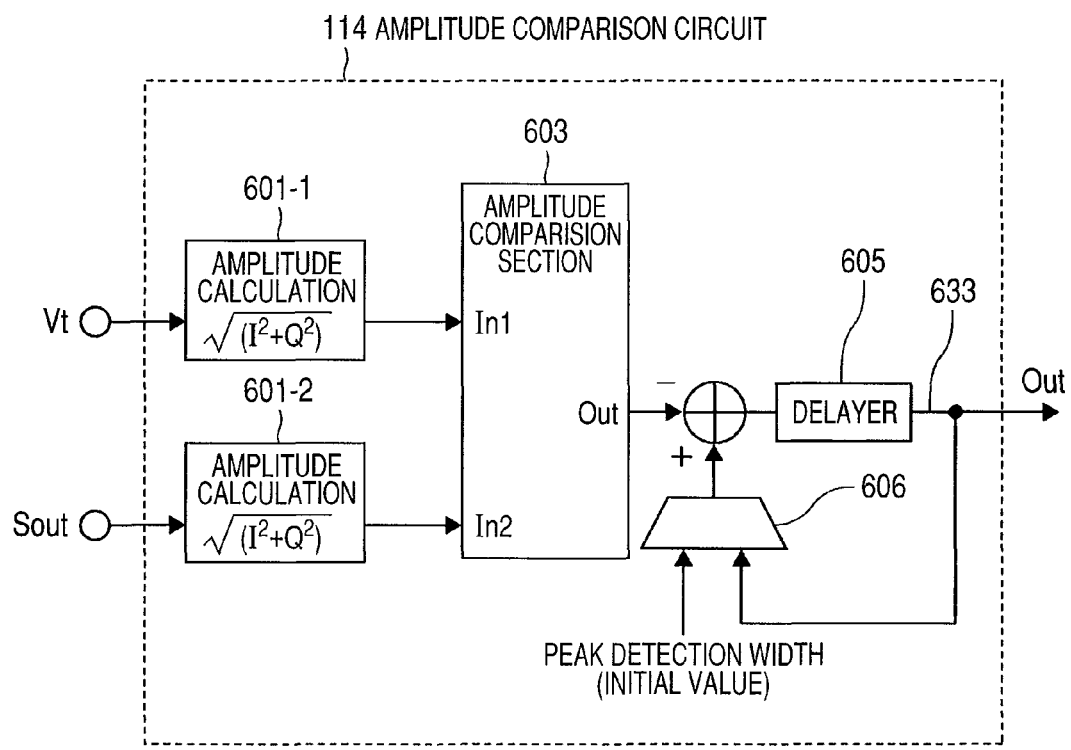
FIG. 11 is a circuit block diagram of an amplitude comparison circuit.
Figure 12:
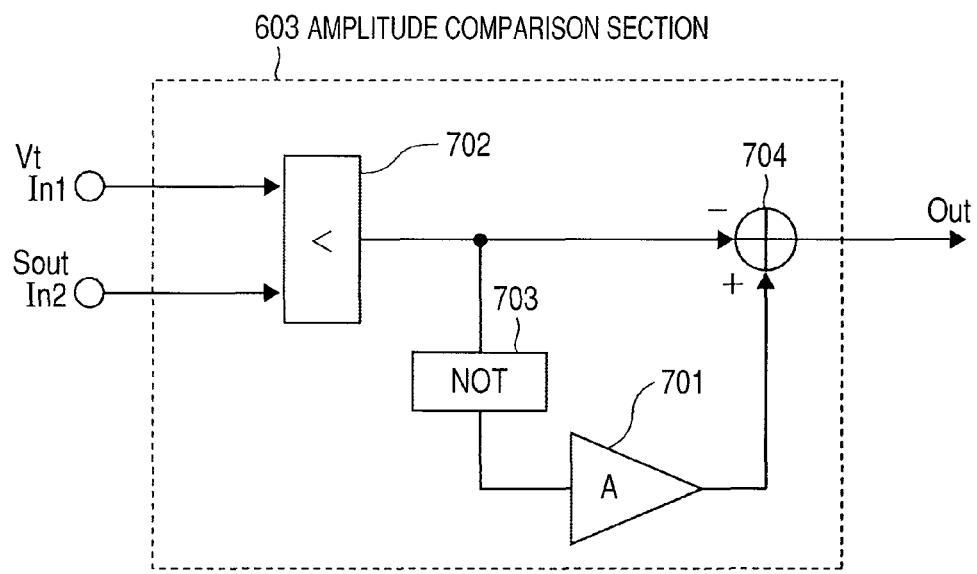
FIG. 12 is a circuit block diagram of an amplitude comparison section.

In FIG. 11, the two amplitude calculation circuits 601 respectively calculate instantaneous amplitude values of the peak factor threshold value Vt and the signal Sout after the peak factor reduction. The amplitude comparison section 603 performs an amplitude comparison between the two output signals from the two amplitude calculation circuits 601. An output of the amplitude comparison section 603 indicates an adjustment in the number of taps at the peak detection width.

The amplitude comparison section 603 will be explained with reference to FIG. 12. In FIG. 12, the amplitude comparison section 603 includes a comparison part 702, a NOT part 703, a gain part 701, and an adder 704. The comparison part 702 compares the amplitude of In1 (Vt) and the amplitude of In2 (Sout). When the peak factor threshold value Vt is lower than Sout in amplitude value, the comparison part 702 outputs "1". If not so, then the comparison part 702 outputs "0". The NOT part 703 interchanges 0 and 1. A value of the gain part 701 is assumed to be a value sufficiently smaller than 1.

Since an error component indicative of a peak factor is sufficiently detected even in the current state of the peak detection width where the amplitude value of the peak factor threshold value Vt is higher than that of the signal Sout, the amplitude comparison section 603 broadens the detected width of peak factor to reduce the EVM. On the other hand, when the amplitude value of the signal Sout is higher than that of the peak factor threshold value Vt, the amplitude comparison section 603 narrows the detected width of peak factor because the detection of the error component is insufficient. An output value of the amplitude comparison section 603 becomes a value 'A' sufficiently smaller than 1 where the amplitude value of the peak factor threshold value Vt is higher than that of the signal Sout, and becomes a value '−1' where the amplitude value of the signal Sout is higher than that of the peak factor threshold value Vt.

Turning back to FIG. 11 again, the output of the amplitude comparison section 603 and the present peak detection width selected by the selector 606 are added together. The selector 606 adds the peak detection width of the initial value and the output of the amplitude comparison section 603 together upon initial processing. Subsequently, the present detection width is delayed by the delayer 605 and fed back to the selector 606, followed by execution of additive processing.

When the amplitude value of the signal Sout is higher than that of the peak factor threshold value Vt, the output value becomes (detection width of present situation)+1. This shows such a configuration that the number of ineffective taps is increased by 1 from the present detection width. Such a configuration narrows the present detection width of peak factor and enhances error detection. On the other hand, when the amplitude value of the peak factor threshold value Vt is higher than that of the signal Sout, the output value becomes (detection width of present situation)−(value sufficiently smaller than 1). This shows such a configuration that the number of ineffective taps is decreased from the present detection width. The post-subtraction output is rounded off in a negative infinite direction and outputted as an integer. Such a configuration broadens the present detection width of peak factor and reduces the EVM.

Finally, the amplitude comparison circuit 114 supplies the output indicative of the peak detection width to the peak detection circuit 101. Even in the case of an adjustment in the detection width, the selector 606 may be caused to select the preset initial value at all times where the peak detection width is not adjusted automatically.

Third Embodiment

Figure 13:
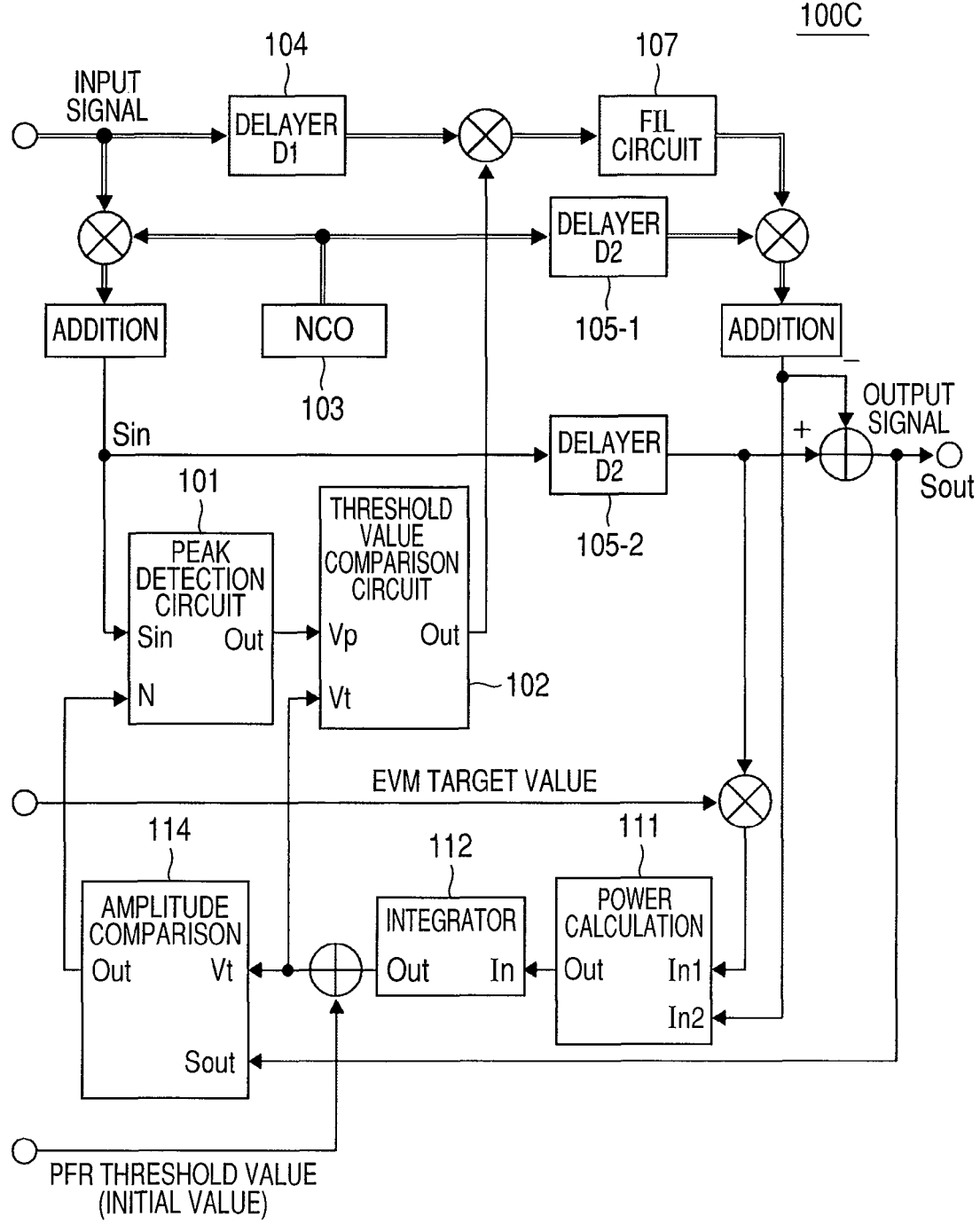
FIG. 13 is a further circuit block diagram of a peak factor reduction device.

A third embodiment will next be explained with reference to FIG. 13. In FIG. 13, a peak factor reduction device 100C includes a peak detection circuit 101, a threshold value comparison circuit 102, an NCO 103, a delayer 104, two delayers 105, a FIL circuit 107, a power calculation circuit 111, an integrator 112, an amplitude comparison circuit 114, a plurality of adders and a plurality of multipliers. Inputs to the peak factor reduction device 100C include an input signal, an EVM target value, and a PFR initial threshold value. The input signal is of a complex signal having I and Q components. An output of the peak factor reduction device 100C is of an output signal reduced in peak factor.

The peak factor reduction device 100C is of a peak factor reduction device in which two elements corresponding to the function of automatically calculating a peak factor threshold value Vt brought to optimal within the EVM target value and the function of automatically adjusting a peak detection width according to a signal level such that the offsetting of peaks is not made insufficient, are combined together.

The peak factor reduction device 100C first calculates instantaneous amplitude values of the peak factor threshold value Vt brought to the optimum within the EVM target value and the signal Sout after the peak factor reduction, both of which have been calculated by the technique shown in the first embodiment. Subsequently, the peak factor reduction device 100C performs a comparison between the two amplitude values shown in the second embodiment. When the amplitude value of the peak factor threshold value is higher than the amplitude value after the peak factor reduction, the peak factor reduction device 100C broadens the detection width of the peak factor. When the amplitude value after the peak factor reduction is higher than that of the peak factor threshold value, the peak factor reduction device 100C performs a process for narrowing the peak detection width and feeds back an output result to the peak detector.

Fourth Embodiment

A peak factor reduction device added with the function of controlling excessive peak offsetting at the function of automatically adjusting a peak detection width will be explained as an extended embodiment of the third embodiment using FIGS. 14 and 15.

Figure 14:
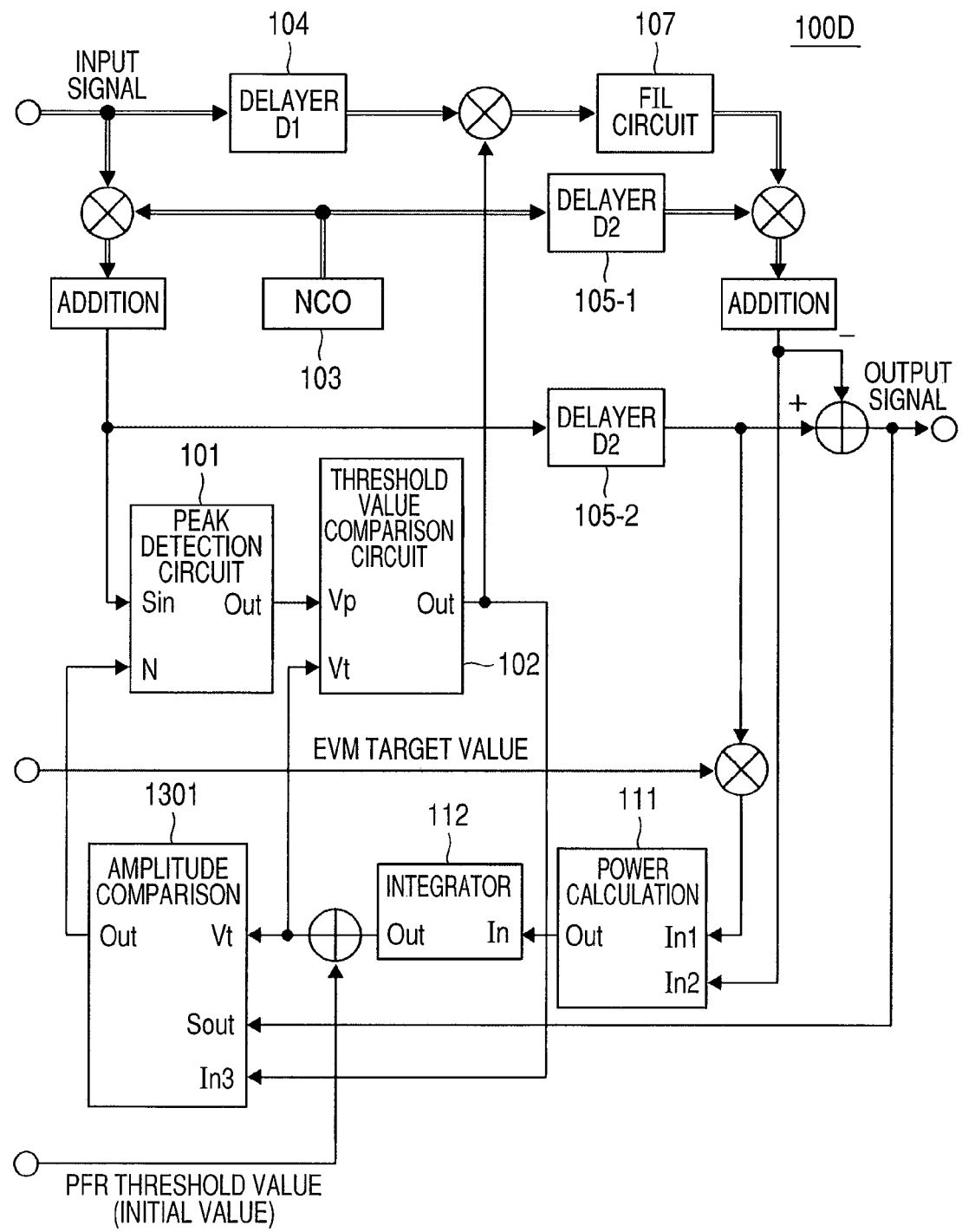
FIG. 14 is a yet another circuit block diagram of a peak factor reduction device.

In FIG. 14, the peak factor reduction device 100D includes a peak detection circuit 101, a threshold value comparison circuit 102, an NCO 103, a delayer 104, two delayers 105, a FIL circuit 107, a power calculation circuit 111, an integrator 112, an amplitude comparison circuit 1301, a plurality of adders, and a plurality of multipliers. Inputs to the peak factor reduction device 100D include an input signal, an EVM target value, and a PFR initial threshold value. The input signal is of a complex signal having I and Q components. An output of the peak factor reduction device 100D is of an output signal reduced in peak factor.

The peak factor reduction device 100D is of a peak factor reduction device in which two elements corresponding to the function of automatically calculating a peak factor threshold value Vt brought to the optimum within the EVM target value and the function of automatically adjusting a peak detection width according to a signal level such that the offsetting of peaks is not made insufficient, are combined together.

Figure 15:
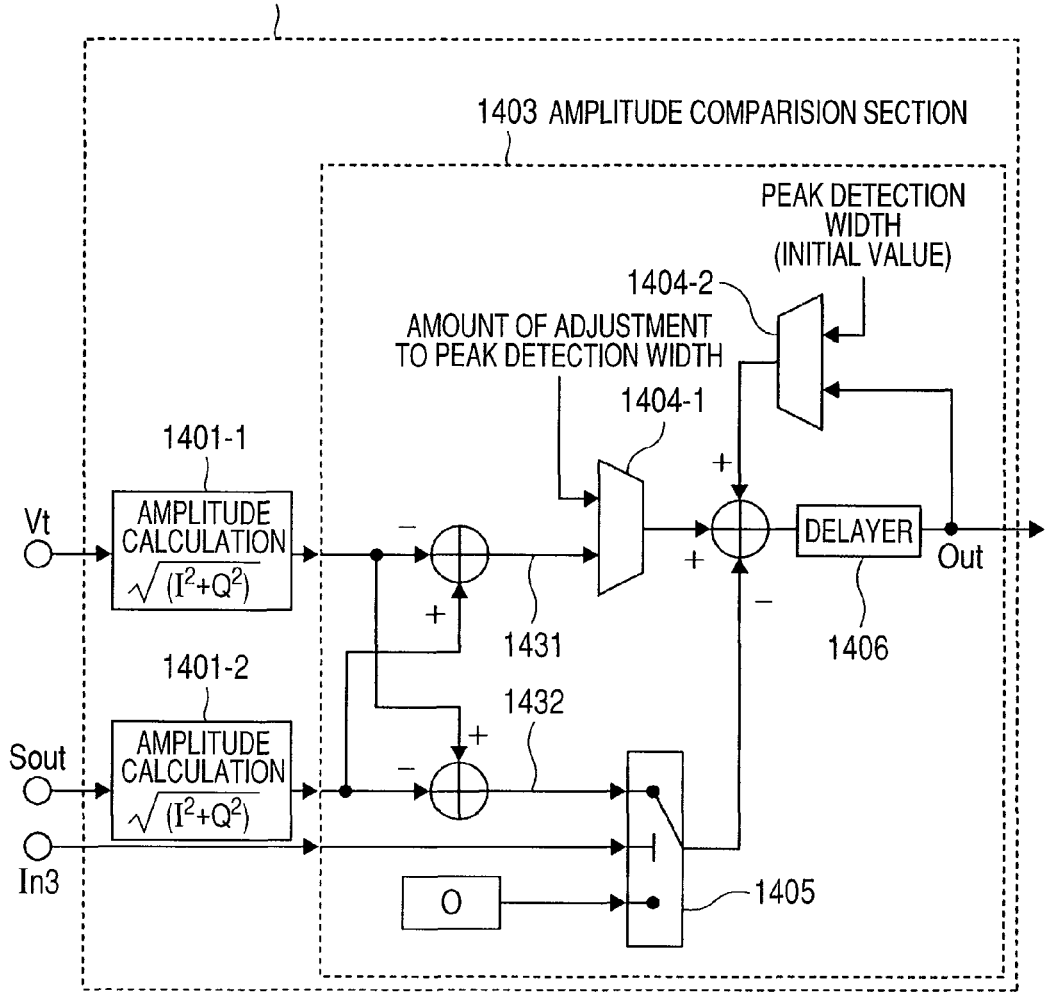
FIG. 15 is another circuit block diagram of an amplitude comparison circuit.

In FIG. 15, the amplitude comparison circuit 1301 includes two amplitude calculation circuits 1401, and an amplitude comparison section 1403. Further, the amplitude comparison section 1403 includes two selectors 1404, a selector 1405, a delayer 1406, and a plurality of adders.

In FIG. 15, the amplitude comparison circuit 1301 first calculates instantaneous amplitude values of the peak factor threshold value Vt brought to the optimum within the EVM target value and the signal Sout after the peak factor reduction at the amplitude calculation circuits 1401. After the calculation of the instantaneous amplitude values, the amplitude comparison circuit 1301 performs the calculation of (Sout−Vt) corresponding to a value exceeding the peak factor threshold value and (Vt−Sout) corresponding to a value less than the peak factor threshold value through the use of the corresponding adders.

When the amplitude level of the signal 1431 indicative of the peak factor threshold excess value is '0' or more, the present peak detection width is insufficient. Therefore, it is necessary to narrow the detection width. At this time, the residual rate of peak offsetting is reduced by adding the function of adjusting the amount of peak detection. An amount of adjustment in peak detection width assumes such a configuration that the peak factor threshold excess value is bit-shifted. A threshold value excessive level is temporarily made high by shifting the peak factor threshold excess value to the right in bit units. It is possible to set the detection width narrow and reduce a peak residual rate by such a configuration. If a bit shift amount gets too large, EVM degradation is then reached. A default value for this amount of adjustment may preferably not be bit-shifted.

On the other hand, the amplitude comparison circuit 1301 compares the signal 1432 indicative of the value less than the peak factor threshold value with an output value of the threshold value comparison circuit 102. The amplitude comparison circuit 1301 outputs a signal not greater than the peak factor threshold value only when the output of the threshold value comparison circuit 102 is given, and outputs zero when other than it.

Finally, subtraction processing is performed and the result of its processing is outputted. Even in this case, when the peak detection width is not adjusted automatically, a selector or the like is provided to output the preset initial value at all times.

Figure 16:
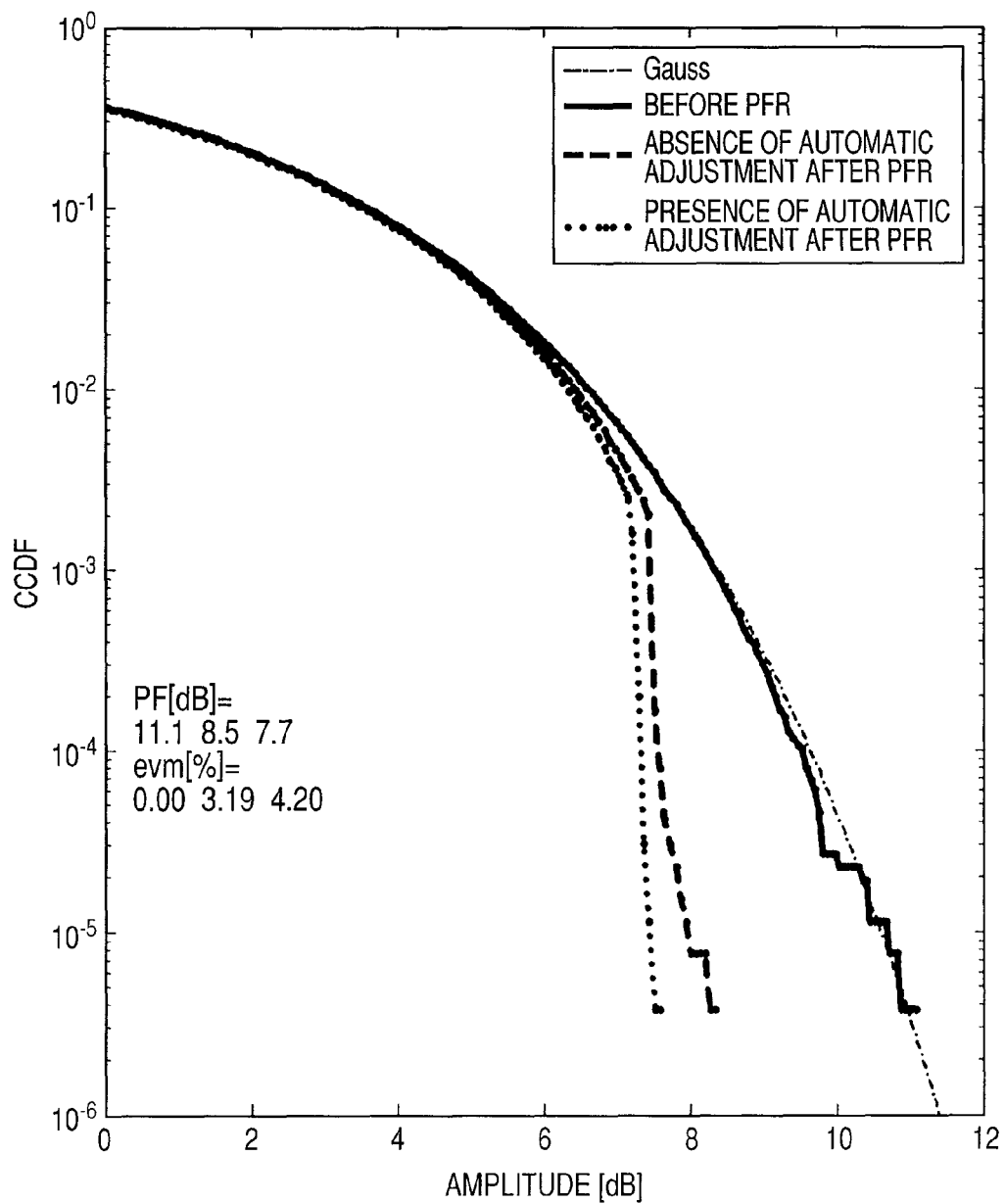
FIG. 16 shows peak factor automatic optimization effective/ineffective simulation results.

Simulation results at the third embodiment and the conventional peak factor reduction device will be explained with reference to FIG. 16. In FIG. 16, the input signal is of a two-carrier long term evolution (LTE) signal obtained by oversampling a complex normal distribution signal of a sampling frequency 7.68 MHz eight times. FIG. 16 shows where a Gauss distribution, a complementary cumulative distribution function (CCDF) prior to a peak factor reduction, a CCDF according to the conventional technique after the peak factor reduction and a CCDF according to the third embodiment after the peak factor reduction at the time that the EVM target value is set to 5.0%, have been plotted using a filter designed for LTE base band filter as a base band filter. The CCDF indicates the probability of occurrence of an amplitude level. The vertical axis indicates CCDF, and the horizontal axis indicates the amplitude. In FIG. 16, a one-dot chain line indicates a Gauss distribution, a solid line indicates a CCDF prior to the peak factor reduction, a broken line indicates a CCDF of the conventional peak factor reduction device, and a dotted line indicates a CCDF of the peak factor reduction device according to the third embodiment.

It can be confirmed from FIG. 16 that the offsetting of a peak factor 8.5 dB and a peak is incomplete because the setting of the peak detection width is inappropriate in the conventional peak factor reduction device. In the peak factor reduction device according to the third embodiment, the incompleteness of the offsetting of a peak factor 7.7 db and a peak has been solved. The peak factor reduction was carried out assuming that an actually-measured value is 4.2% with respect to an EVM target value 5.0%.

Figure 17A:
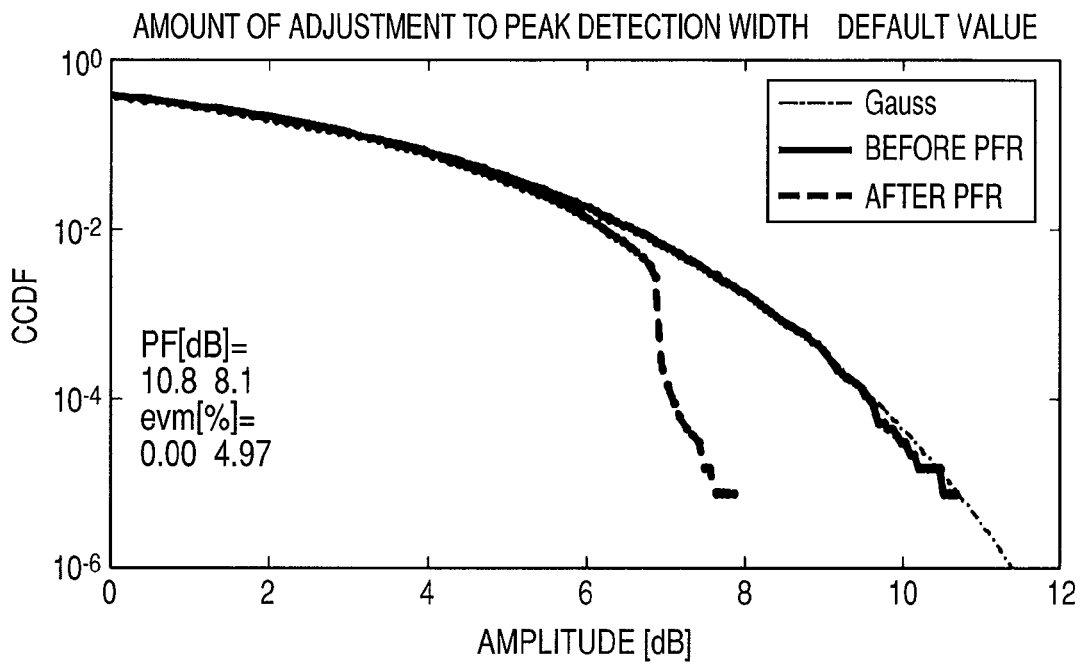
FIG. 17A shows simulation result of default value for amounts of adjustment in peak detection width.
Figure 17B:
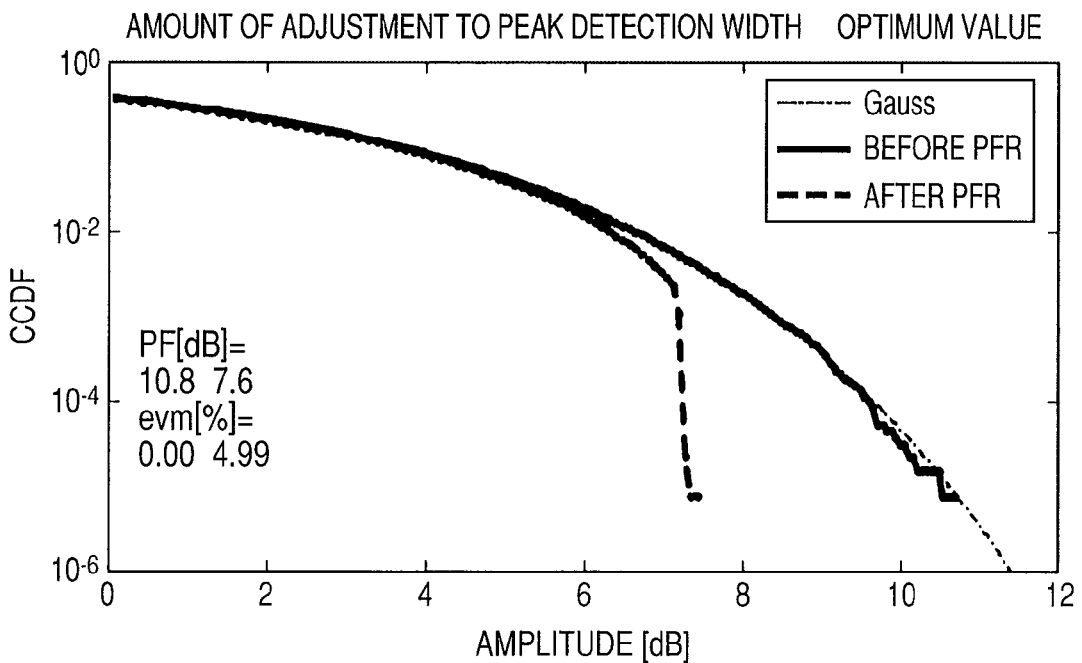
FIG. 17B shows simulation result of optimum value for amounts of adjustment in peak detection width.

Simulation results where the fourth embodiment is applied, will next be explained using FIGS. 17A and 17B. In the figure, FIG. 17A shows where the amount of adjustment in the peak detection width is made free of a bit shift. Also, FIG. 17B shows where the amount of adjustment in the peak detection width is adjusted to the optimum. Since the peak offsetting is incomplete though the accuracy relative to the EVM target value is enhanced in a state in which the amount of adjustment in the peak detection width is set to the default value (made free of the bit shift), the peak factor also becomes 8.1 dB. In order to solve the incompleteness of the peak offsetting, the amount of adjustment in the peak detection width is shifted to the right by 4 bits to narrow the detection width in advance when the amount of adjustment in the peak detection width is adjusted so as to reach the optimum. It can be confirmed in FIG. 17B that the offsetting of peaks has been satisfied and the accuracy to the EVM target value has also been enhanced.

As described above, the above-described embodiment is capable of realizing a peak factor reduction device in which the peak factor threshold value and the effective window width at the peak factor are automatically adjusted to enable a reduction in peak factor within a range of a desired EVM value.

Fifth Embodiment

A base station using a peak factor reduction device will next be described with reference to FIGS. 18 and 19. A remote radio head (RRH) will first be explained here with reference to FIG. 18. A wireless communication system will next be explained with reference to FIG. 19.

Figure 18:
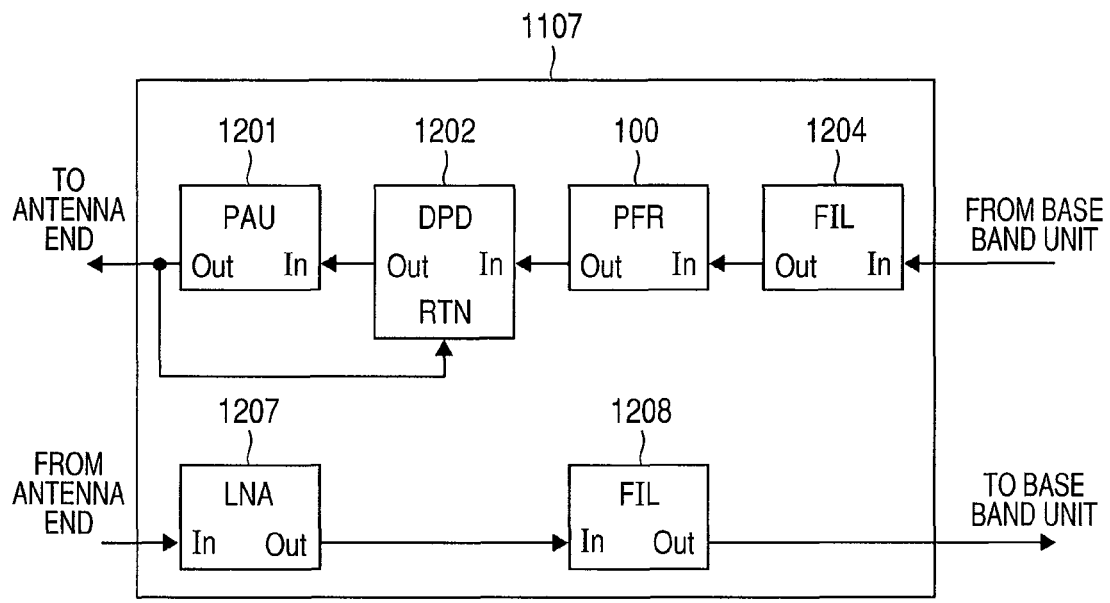
FIG. 18 is a circuit block diagram of a remote radio head.
Figure 19:
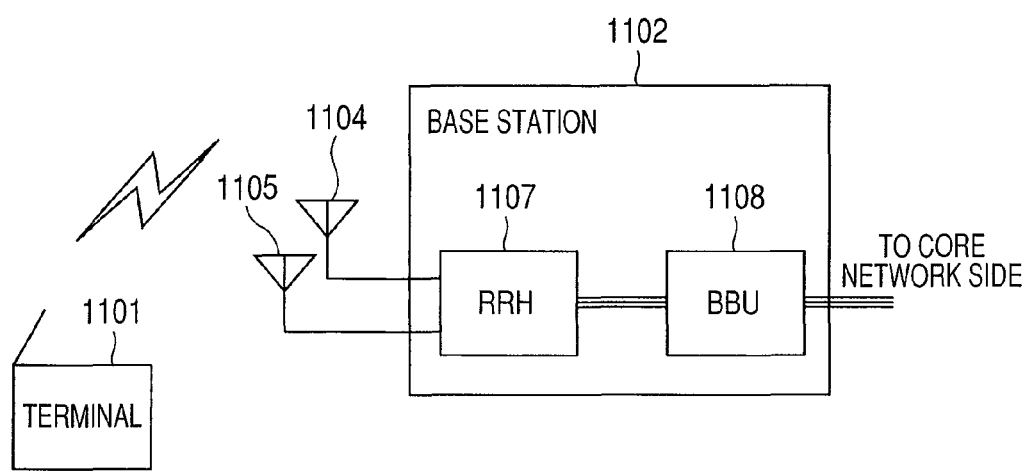
FIG. 19 is a block diagram of a wireless communication system.

In FIG. 18, the RRH 1107 includes a filter (FIL) circuit 1204, a peak factor reduction (PFR) device 100, a digital pre-distortion (DPD) circuit 1202, a power amplifier unit (PAU) 1201, a low noise amplifier (LNA) 1207, and a filter (FIL) circuit 1208.

A transmission system will be explained. The FIL circuit 1204 performs a band limit to a base band signal outputted from a base band unit (BBU). The PFR device 100 suppresses instantaneous power relative to average power with respect to the band-limited signal without generating distortion components outside the band. The DPD circuit 1202 compensates for a non-linear component of the power amplifier unit of the subsequent stage with respect to the signal outputted from the PFR device 100. Since the input/output characteristics of the power amplifier unit is non-linear, the DPD circuit 1202 adds such a reverse characteristics to linearize the input/output characteristics of the power amplifier unit. Therefore, the DPD circuit 1202 needs to grasp the input/output characteristics of the power amplifier unit. To this end, the DPD circuit 1202 feeds back the output of the PAU 1201 thereto to compensate for the input/output characteristics of the power amplifier unit. Finally, the PAU 1201 performs power amplification and performs transmission through an antenna end.

Regarding a reception system, the LNA 1207 performs power amplification on a signal received from the antenna end. Thereafter, the received signal subjected to the power amplification is performed analog-to-digital conversion. The FIL circuit 1208 performs a band limit to the converted signal. The RRH 1107 supplies the band-limited received signal to the base band unit.

A wireless system will next be described with reference to FIG. 19. In FIG. 19, the wireless system includes a base station and a terminal. The base station 1102 includes a BBU 1108, an RRH 1107, and antennas 1104 and 1105. The BBU 1108 performs base band signal processing. The RRH 1107 performs RF signal processing. The base station 1102 performs wireless communication with the terminal 1101. The antenna 1104 is a transmitting antenna. The antenna 1105 is a receiving antenna.

In the base station 1102, the RRH 1107 is equipped with the above-described peak factor reduction device. Consequently, the base station 1102 performs peak factor reducing processing within an EVM target value regardless of transmission conditions. The base station 1102 is capable of more suppressing the logic scale.

What is claimed is:

1. A peak factor reduction device comprising:
   a generation section for multiplying a plurality of complex base band signals by complex exponential function signals having frequencies corresponding to the complex base band signals respectively to perform frequency conversion, and adding and combining the frequency-converted signals together to generate a multi-carrier composite signal;
   a peak detection section for calculating an instantaneous amplitude value of the multi-carrier composite signal and detecting a peak amplitude value brought to a maximum within a detection width;
   a threshold value comparison section for comparing the peak amplitude value calculated by the peak detection section and a peak factor threshold value, calculating an excessive level by which the peak amplitude value exceeds the peak factor threshold value, and outputting a signal obtained by normalizing the excessive level with the peak amplitude value;
   a first delayer for delaying the complex base band signals by the number of samples corresponding to a processing delay of the peak detection section and the threshold value comparison section;
   a first multiplier for multiplying an output of the threshold value comparison section and an output of the first delayer by each other;
   a filter for band-limiting an output of the first multiplier;
   a second delayer for delaying the multi-carrier composite signal by the number of samples corresponding to a processing delay of the peak detection section, the threshold value comparison section, and the filter;
   a third delayer for delaying the complex exponential function signals by the number of samples corresponding to the processing delay of the peak detection section, the threshold value comparison section, and the filter;
   a second multiplier for multiplying an output of the filter and an output of the third delayer by each other to perform frequency conversion;
   an adder for performing an additive synthesis on an output of the second multiplier to generate a peak suppression signal; and
   a subtractor for subtracting the peak suppression signal from an output of the second delayer.

2. The peak factor reduction device according to claim 1, further including a power calculation section for performing a power calculation of a signal obtained by multiplying the output of the second delayer and an EVM target value by each other and the peak suppression signal to thereby output a difference in power therebetween, and an integrator for performing an integrating process on the output of the power calculation section,
   wherein a second peak factor threshold value obtained by adding an initial value of a peak factor threshold value to an output of the integrator is set as the peak factor threshold value of the threshold value comparison section.

3. The peak factor reduction device according to claim 1, further including an amplitude comparison section for performing an amplitude comparison between a third peak factor threshold value and an output of the subtractor and thereby outputting a second detection width,
wherein the second detection width is set as the detection width.

4. The peak factor reduction device according to claim 3, wherein when the output of the subtractor is smaller than the third peak factor threshold value, the amplitude comparison section outputs a third detection width narrower than the second detection width, and
wherein the third detection width is set as the detection width.

5. A base station comprising:
a remote radio head for performing wireless signal processing; and
a base band unit,
wherein the remote radio head includes a second filter for band-limiting a base band signal outputted from the base band unit, a peak factor reduction device for suppressing instantaneous power relative to average power from an output of the second filter, a digital predistortion circuit for compensating for a non-linear component of a power amplifier of a subsequent stage with respect to an output signal of the peak factor reduction device, and the power amplifier for power-amplifying an output of the digital predistortion circuit, and
wherein the peak factor reduction device comprises:
a generation section for multiplying a plurality of complex base band signals by complex exponential function signals having frequencies corresponding to the complex base band signals respectively to perform frequency conversion, and adding and combining the frequency-converted signals together to generate a multi-carrier composite signal;
a peak detection section for calculating an instantaneous amplitude value of the multi-carrier composite signal and detecting a peak amplitude value brought to a maximum within a detection width;
a threshold value comparison section for comparing the peak amplitude value calculated by the peak detection section and a peak factor threshold value, calculating an excessive level by which the peak amplitude value exceeds the peak factor threshold value, and outputting a signal obtained by normalizing the excessive level with the peak amplitude value;
a first delayer for delaying the complex base band signals by the number of samples corresponding to a processing delay of the peak detection section and the threshold value comparison section;
a first multiplier for multiplying an output of the threshold value comparison section and an output of the first delayer by each other;
a filter for band-limiting an output of the first multiplier;
a second delayer for delaying the multi-carrier composite signal by the number of samples corresponding to a processing delay of the peak detection section, the threshold value comparison section, and the filter;
a third delayer for delaying the complex exponential function signals by the number of samples corresponding to the processing delay of the peak detection section, the threshold value comparison section, and the filter;
a second multiplier for multiplying an output of the filter and an output of the third delayer by each other to perform frequency conversion;
an adder for performing an additive synthesis on an output of the second multiplier to generate a peak suppression signal; and
a subtractor for subtracting the peak suppression signal from an output of the second delayer.

* * * * *